(12) United States Patent
Carlstrom et al.

(10) Patent No.: US 6,803,530 B2
(45) Date of Patent: Oct. 12, 2004

(54) SYSTEM AND METHOD FOR VEHICLE AXLE LOAD MEASUREMENT WITH HYSTERESIS COMPENSATION AND ACCELERATION FILTER

(75) Inventors: Kevin R. Carlstrom, Fort Wayne, IN (US); Gerald L. Larson, Fort Wayne, IN (US); Matthew J. Gumbel, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 74 days.

(21) Appl. No.: 10/389,190

(22) Filed: Mar. 15, 2003

(65) Prior Publication Data

US 2004/0178005 A1 Sep. 16, 2004

(51) Int. Cl.[7] .............................. G01G 19/08
(52) U.S. Cl. ................ 177/136; 177/137; 177/141; 177/185; 702/101; 702/174
(58) Field of Search .................. 177/136–141, 177/185; 702/101, 102, 173–175

(56) References Cited

U.S. PATENT DOCUMENTS

| | | | | |
|---|---|---|---|---|
| 4,379,495 A | * | 4/1983 | Cocks et al. | 177/1 |
| 4,553,619 A | * | 11/1985 | Fujinaga | 177/185 |
| 4,832,141 A | | 5/1989 | Perini et al. | 177/141 |
| 5,478,974 A | | 12/1995 | O'Dea | 177/25.14 |
| 5,780,782 A | | 7/1998 | O'Dea | 177/136 |
| 5,780,783 A | | 7/1998 | Heider et al. | 177/137 |
| 6,449,582 B1 | | 9/2002 | Chaklader | 702/173 |

* cited by examiner

*Primary Examiner*—Randy W. Gibson
(74) *Attorney, Agent, or Firm*—Jeffrey P. Calfa; Dennis Kelly Sullivan; Susan L. Lukasik

(57) ABSTRACT

Vehicle on-board measurement of axle load and gross combined vehicle weight is improved for an air bladder suspended vehicle by allowing for suspension hysteresis. Suspension hysteresis results in at least two distinct air pressures being possible in an air bladder for a single load. The system also reduces the disruptive effect of vehicle acceleration and deceleration on load determination. Vehicle drive train management is enhanced using the load information to effect transmission gear selection.

23 Claims, 10 Drawing Sheets

SYSTEM AND METHOD FOR VEHICLE AXLE LOAD MEASUREMENT WITH HYSTERESIS COMPENSATION AND ACCELERATION FILTER

BACKGROUND OF THE INVENTION

1. Field of the Invention

The invention relates to a system and method for determining drive axle loading and estimating a vehicle's sprung weight with improved accuracy.

2. Description of the Problem

Axle and total vehicle load are limited by law for trucks and desirable to monitor to avoid vehicle operating conditions which would be uneconomic or contribute to poor vehicle handling. To the present time, axle loading and vehicle weight have typically been determined by placing the vehicle on, or rolling the vehicle over, a scale. Commercial scales are often located at some distance from where a load is taken on. The need to then move the vehicle to the scale can be inconvenient. Should a vehicle prove overloaded with a subsequent need to return the vehicle to the loading point, the inconvenience factor is increased. Nor is a load necessarily constant during vehicle operation. Ice storms and heavy snow can contribute to overloading a vehicle. Loads may shift due to extreme operating conditions. Thus there is a need to provide updates of axle loading during vehicle use.

In response to the inconvenience and limited utility of using fixed scales to determine truck loads, and the interest in providing up to date information on axle loading, attempts have been made to provide on board vehicle weight and axle load measurement. One such technique estimates a vehicle's mass using Newton's law of acceleration. Force (torque) equals mass (the unknown) times acceleration. Full load engine torque may be obtained from a look up table and vehicle acceleration calculated from changes in vehicle speed over time. Vehicle mass is then easily calculated although several trials are often required. The accuracy of the result though depends upon engine operation meeting expected output, which can vary with age of the engine, the degree of streamlining of the vehicle, and other factors. The accuracy of the result may be further affected by external conditions such as weather and wind conditions, road slopes and the like.

Also known are systems relying on strain gauges fitted to leaf and coil springs, various types of displacement transducers, and of particular interest here, pressure transducers for air bladders used on height-leveled, air spring suspended vehicles. Vehicles equipped with air spring suspensions have used air gauges to monitor overall air pressure in air suspension springs. The gauge pressure has been equated to vehicle sprung weight for display to the driver. Alternatively, the pressure of individual air springs may be equated to loads on each of the axles. Some of these systems have provided for calibration against known loads to improve accuracy of the estimated weight.

One source of deviation from correct determination of vehicle weight and axle load is suspension system hysteresis. For a suspension system having air springs, the relationship of axle load to air pressure in the springs depends upon whether the load has previously increased or decreased. There are a number of sources of this hysteresis, some of which is designed into the system. Height-leveled, air spring equipped vehicles have a height control valve which will not open to allow the exhaust of air, or introduction of air, unless there is about a 900 lb. change in load. Spring bushings will exhibit some resistance to deformation. Stiction in the shock absorber allows some of the normally sprung load weight to be carried through the shock absorber.

Another source of transient error when using air spring pressure sensing to estimate axle loading is a change in vehicle speed. With acceleration, or deceleration, axle loading is transferred aft or forward, respectively. The error introduced by acceleration and deceleration can be substantial and immediately updating an axle load display to reflect the measured changes can become distracting to the vehicle's operator.

Many contemporary commercial vehicles optimize automatic transmission start gears, shift point and running gear selection based on a trial and error seek process carried out over 25 to 30 trials involving sustained acceleration of the vehicle. In effect, the information is a byproduct of determining the vehicles' mass, as described above. Data relating to the vehicles' mass may be joined with an instantaneous velocity measurement to provide inputs into a look up table which returns an optimum gear choice for either best acceleration or economy operation. However, the need for repeated trials limits the utility of the system for vehicles such as dump trucks, delivery vehicles, and tankers subject to frequent changes in load.

SUMMARY OF THE INVENTION

The invention provides an axle load sensing system for a vehicle having an air bladder support system mounted between the frame of the vehicle and its axles. Axle load determination provides direct determination of vehicle load, which in turn is used to improve start gear, running gear and shift point optimization. At least a first pressure sensor provides air pressure readings for at least one air bladder of the air bladder support system. First and second transfer functions relate the air pressure readings to the weight carried by the air bladder support system. A transfer function indicator responsive to a direction of change in air pressure readings indicates which of the first and second transfer functions is to be interrogated to determine load. A processor connected to receive the air pressure readings and responsive to the transfer function indicator executes either the first or second transfer function using the air pressure readings as an input to return an estimated load carried by the air bladder support system. The transfer function indicator is responsive to prior increases in air bladder pressure for indicating interrogation of the first transfer function and to prior decreases in air bladder pressure for indicating interrogation of the second transfer function. The processor accumulates the returned estimates to provide a running indication of the load on the air bladder support system. To compensate for transient effects of vehicle acceleration on axle loads, returned estimates and the prior accumulated returned estimates are relatively weighted before being combined. Gear selection is improved with the weight data by providing gear choice look up tables for use by a transmission controller keyed to vehicle weight and speed.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
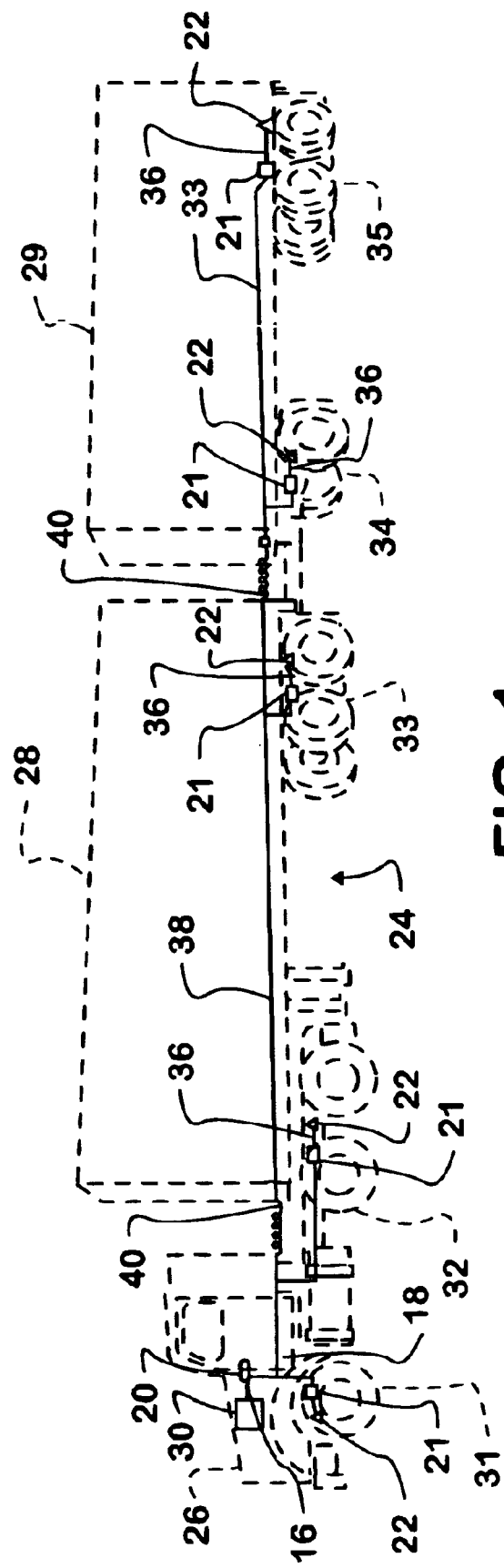
FIG. 1 is a schematic view of a tractor/trailer rig with an on board weighing system according to a preferred embodiment of the invention.

With reference to FIG. 1, an on-board vehicle weighing system 18 according to a preferred embodiment of the invention is illustrated. On-board weighing system 18 is installed on a truck 24 comprising a tractor 26 and possibly one or two trailers 28, 29. Trailers 28, 29 may be replaced, or removed, and may or may not be equipped with an air spring or equivalent suspension system providing vehicle height leveling with changes in load.

Truck 24 includes a sprung load and an unsprung support system provided by vehicle support sections 31, 32, 33, 34 and 35. All of vehicle support sections 31–35 comprise conventional components including wheels, one or two axles, air bladders/springs, shock absorbers, connecting links, stabilizer bars and other suspension stabilizing components, i.e. all of the vehicle's unsprung weight but a negligible portion of its sprung weight. A forward tractor 31 support system includes a steering axle. Vehicle support section 32 includes a pair of drive axles located under a fifth wheel 201 (shown in FIG. 7). Support section 32 conventionally supports a portion of the load of trailer 28. The sprung weight of truck 24 is carried through the air springs on the axles (described below with reference to FIG. 2). Air pressure in the air springs is varied with the aim of maintaining tractor 26 and trailers 28, 29 at a predetermined height.

On-board weighing system 18 includes instrumentalities for collecting air pressure information for the air springs/bladders. Data collection is effected using an auxiliary gauge controller 20 which communicates with a plurality of pressure sensors 22 through pressure sensor monitoring units 21. Pressure sensors 22 may be applied one to each air spring, one to the air springs for each axle, or in the case of tractor 26, one for the air springs for the forward vehicle support section 31, including the steering axle, and one for the air springs used with the drive axles in vehicle support section 32.

The pressure sensor monitoring units 21 communicate with auxiliary gauge controller 20 over a communications/power supply link 38 located in the trailers 28, 29, which are connected to each other and to the tractor over disconnect plugs 40. The disconnect plug 40 for the forward trailer 28 is connected to a communications/power link 18 in tractor 26. Communications/power link 18 is connected to auxiliary gauge controller 20, which is a node of a controller area network (CAN) including an electronic system controller 30 and a CAN data link 16 interconnecting a plurality of controllers for various vehicle functions.

Figure 2:
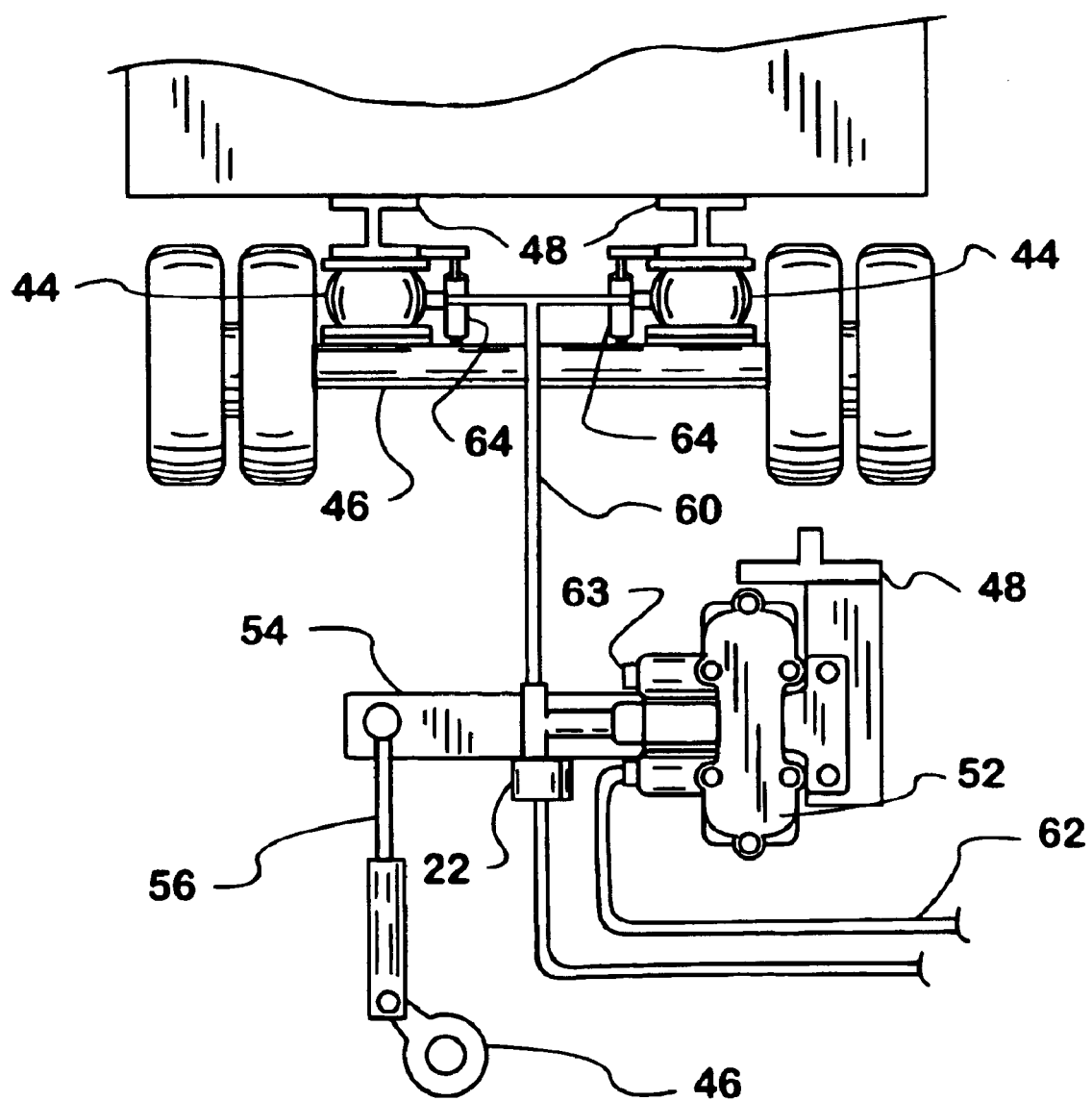
FIG. 2 is a schematic view of an air suspension for a vehicle adapted to provide air spring pressure information.

FIG. 2 is illustrative generally of the functional components of any of vehicle support sections 31–35. A pair of air springs 44 is mounted between axle 46 and side frame rails 48 of a vehicle frame. The inflation pressure of air springs 44 is regulated with a height-leveling valve 52 mounted to one of the frame side rails 48 and operated by a valve-actuator arm 54 and push rod 52 connected to axle 46. The pressurization in air springs 44 is illustrated as being individually controlled by providing each with its own height leveling valve, one being mounted to each frame rail 48. More typically, each support section will have one valve, but by providing individual air bladder control, side to side height is more readily maintained. Height leveling valve 52 allows the introduction of compressed air to or exhausts air from air springs 44 through an air line 60 connecting the leveling valve 52 and the air springs 44. The air springs 44 are directed to supporting the vehicle at a target height above axle 46. Compressed air is supplied to the leveling valve 52 by a delivery air line 62 from an air tank. Excess air is vented from an exhaust port 63.

Motion of the frame side rails 48 on the air springs 44 is damped by shock absorbers 64 mounted in parallel to the air springs 44 between axle 46 and frame side rails 48. While shock absorbers 64 are illustrated as positioned inboard from air springs 44, they are typically located forward from or aft of the air springs. An air pressure sensor 22 is connected into air line 60 to obtain an average pressure reading for the two or four air springs provided in a vehicle support section.

Air spring inflation pressure established by height leveling valve 52 with the pressure usually being related to one of two possible loads on the spring. This stems from valve 52 being designed with a dead band to prevent seeking. Stiction in shock absorbers 64 can result in the shock absorbers carrying a portion of the spring weight. Air spring bushings (not shown) may resist deformation at different rates depending on load. All of these factors contribute to suspension hysteresis.

Figure 3:
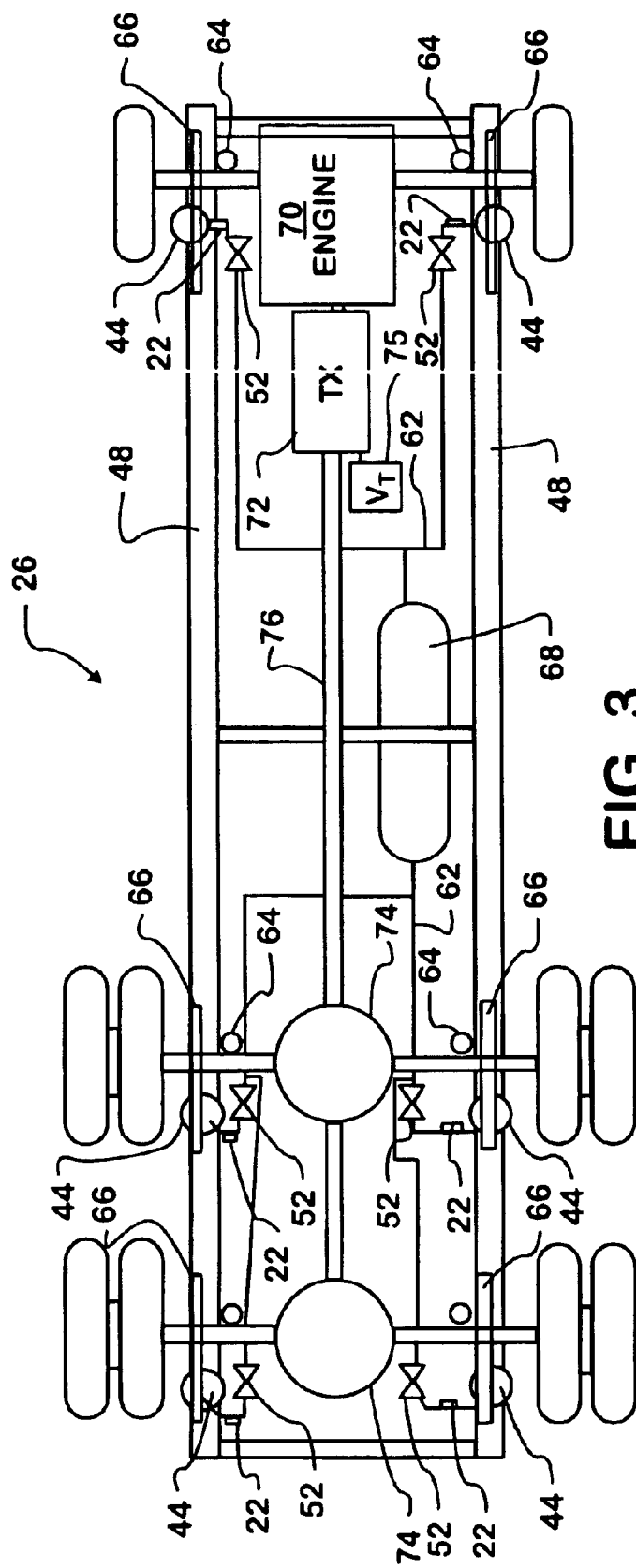
FIG. 3 is a schematic view of a tractor with an on board weighing system.

Referring particularly to FIG. 3, a tractor 26 illustrates individual height leveling valves 52 and pressure sensors 21 being provided for each air spring 44 for complete axle load determination. Additional suspension stabilizing linkages 66 are associated with each air spring 44 depending from frame side rails 48. Air lines 62 connect to a compressed air tank 68 installed on tractor 26 between side frame rails 48. An engine 70 provides motive power for tractor 26, driving a propeller shaft 76 by a semi-automatic transmission 72. Propeller shaft 76 is connected between the transmission 72 and a pair of differentials 74. A tachometer 75 is coupled to propeller shaft 76 to determine the average rotational velocity of the drive wheels and thereby allow vehicle speed to be estimated.

Figure 4:
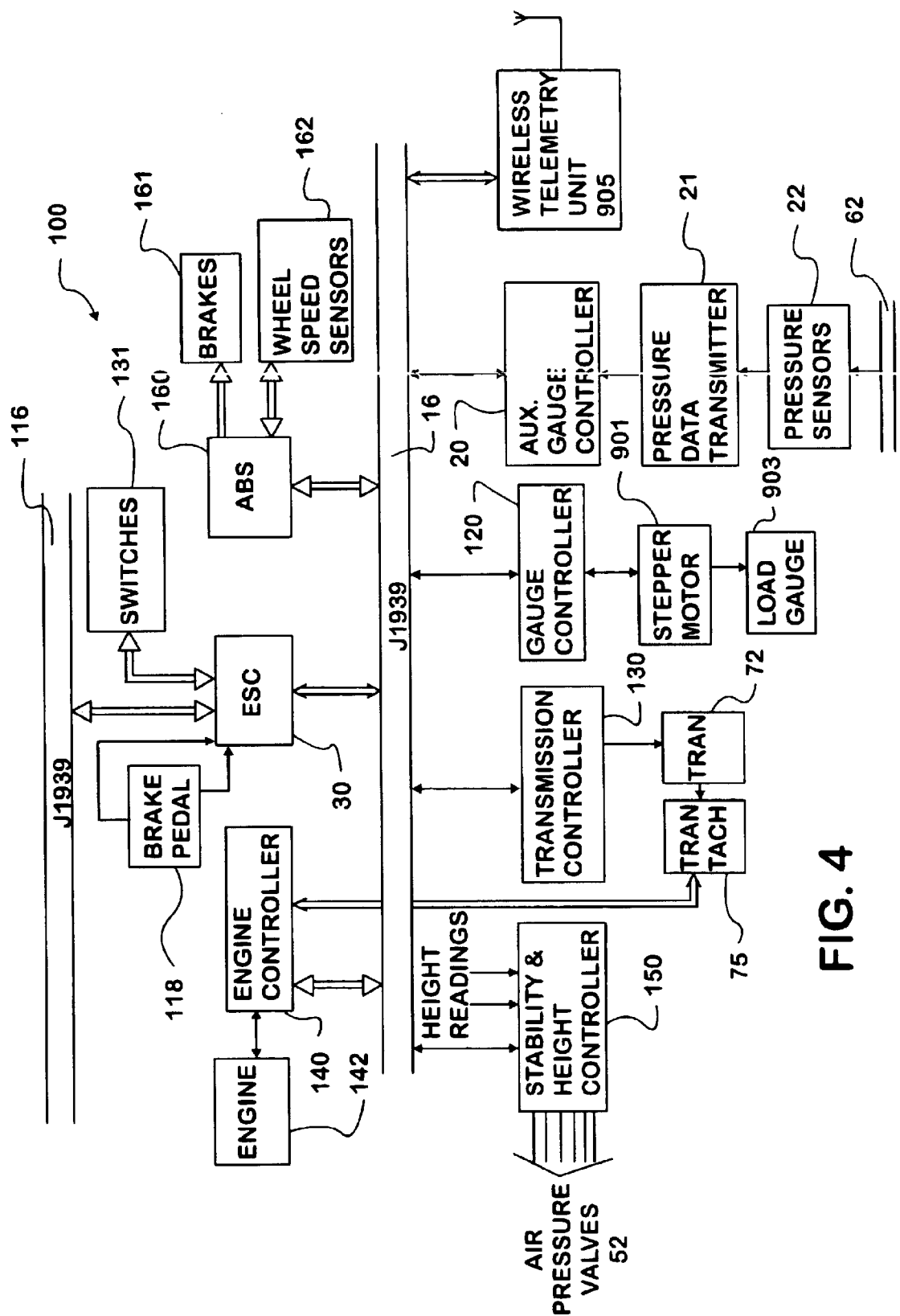
FIG. 4 is a block diagram of a vehicle electronic control system.

With reference to FIG. 4, a vehicle electronic control system or CAN 100 for tractor 26 is schematically illustrated. Vehicle electronic control system 100 is a generalization of applications of contemporary digital networks to motor vehicles, based on the Society of Automotive Engineers SAE J1939 standard for controller area networks. Other CAN prototypes exist and the invention will work with those as well. An SAE J1939 compliant bus 16 interconnects a plurality of controllers related to primary vehicle functions. Among these controllers are an engine controller 140, an anti-lock brake system controller 160, a gauge controller 120, a transmission controller 130 (for automatic and semi-automatic equipped vehicles), an auxiliary gauge controller 20 and an electronic system controller (ESC) 30. Vehicles may in the future include a stability and height controller 150 although at present vehicle height control is handled mechanically. Nonetheless, vehicle weight and axle load information are of direct use to the engine controller 140, ESC 30 and transmission controller 130.

ESC 30, unlike most of the other modules, is not concerned strictly with the function of a particular system or subset of devices, but monitors all of the other controllers and can be used to implement algorithms directed to optimizing vehicle operation. ESC 30 may also be assigned direct control of a subset of vehicle functions, here including monitoring operation of brake pedal system 118, monitoring a switch package 131 and acting as a gateway between the public J1939 bus 16 and a proprietary J1939 bus 116. ESC 30 also manages a wireless telemetry unit 905 which may be provided to relay vehicle load information to an operational base.

Engine controller 140 manages operation of an internal combustion engine 70. Engine controller generates an estimate of instantaneous engine torque from fuel flow, engine rpms and appropriate preprogrammed look up tables. Engine torque is then made available on the bus 16. Anti-lock brake system controller 160 controls application of brakes 161 and is limited by indication of wheel lock up from wheel speed sensors 162. In some vehicles ABS 160 may provide a vehicle speed signal determined from the outputs of the wheel speed sensors 162 although this function is conventionally handled by engine controller 140, which is connected to a transmission tachometer 75. Transmission tachometer 75 generates a vehicle speed estimate based on the average rotational speeds of the drive wheels of tractor 26 from a transmission output shaft. Gauge controller 120 typically handles a standard instrument package. Auxiliary gauge controller 20 handles additional instruments and dash board inputs as well as the readings of pressure sensors 22 taken from air lines 62. A transmission controller 130 controls transmission 72 and is operated to dynamically select start gears, to modify shift points and to select a running gear of transmission 72 based on vehicle weight, speed and engine torque.

Vehicles may in the future be equipped with a height and stability controller 150 which will adjust vehicle height and individual air spring pressurization to counter the effects of persistent cross winds, cornering, indication of excessive vehicle roll, etc. as indicated by axle load determination. Such a controller would require displacement input from the push-rods 56 positioned about a vehicle. The stability and height controller 150 could then operate on these inputs and perhaps on differential wheel speed information supplied by ABS 160 to control air pressure valves 52 for air springs located along the sides of the vehicle. Actual pressure data from auxiliary gauge controller 20 can provide feedback pressurization limit.

Vehicle load measurements are formatted as signals by scaling the measurement to be proportioned to the load range which is of interest to the operator. The information is then formatted for transmittal over the SEA J1939 bus 16 as provided by the protocol. The signal is picked up by gauge controller 120 for display to the operator, by transmission controller 130 to be used as an argument in interrogating a gear choice look up table, and for transmission over a wireless link. Gauge controller 120 translates the signal into a useful output for a stepper motor 901, which drives a load gauge 903.

The several controllers are data processing units implemented using conventional microprocessor and memory technology. They are programmable and have access to stored look up tables which may be loaded with empirically collected data.

Figure 5:
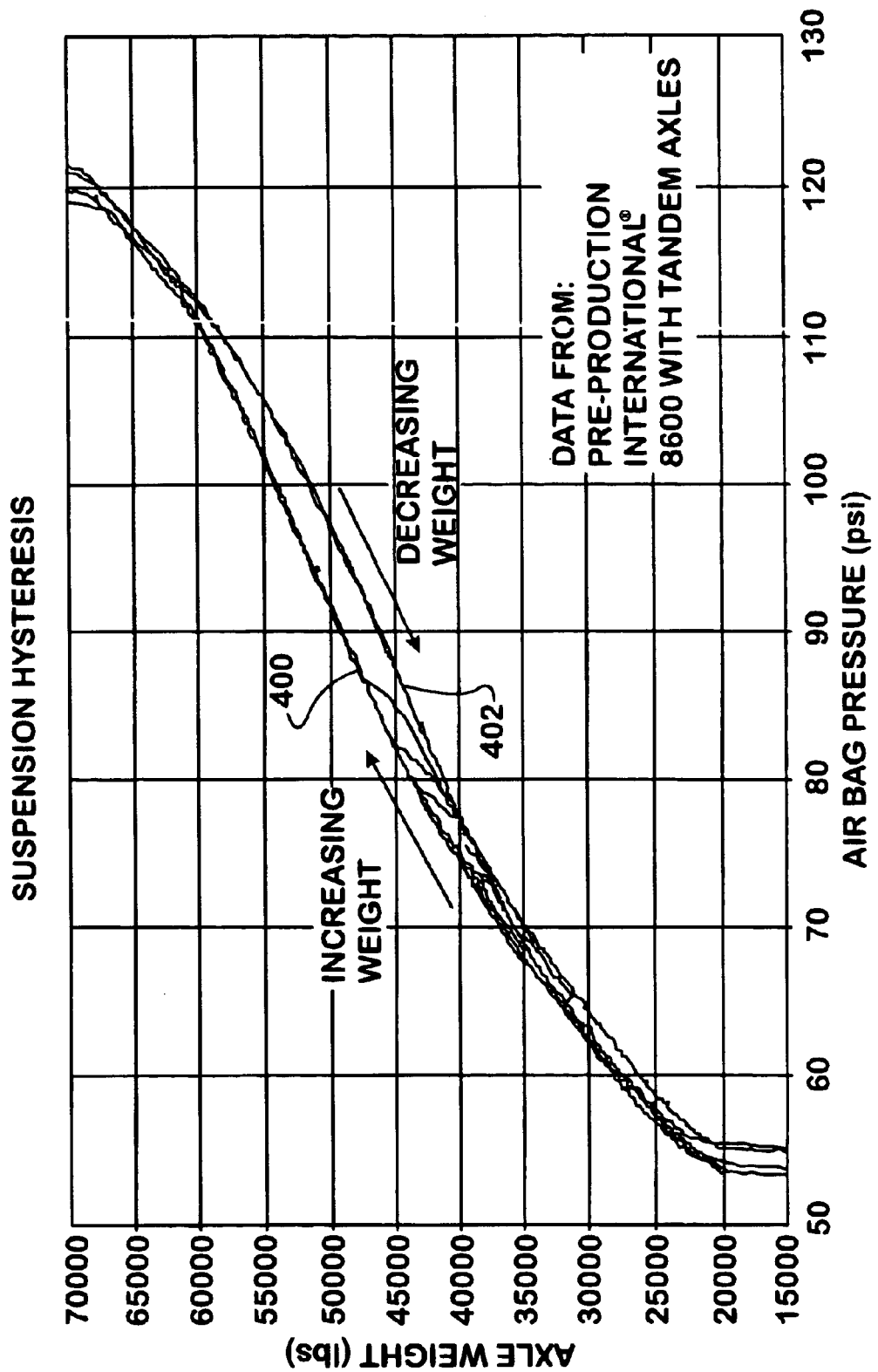
FIG. 5 is a graphical representation of air suspension system hysteresis with axle load as functions of air bladder pressure.

Referring now to FIG. 5, indicated vehicle axle load is a function of air pressure in the air bags or springs and whether the load is increasing or decreasing. The pressure data illustrated was developed from a preproduction prototype International 8600 series tractor with tandem drive axles and is referred to here for illustrative purposes only. As described above, suspension hysteresis results primarily from suspension component striction and a built in dead band in the inflation control valve. Axle load is also a function of whether the vehicle is accelerating or decelerating, which shifts weight temporarily from or onto an axle.

Figure 6:
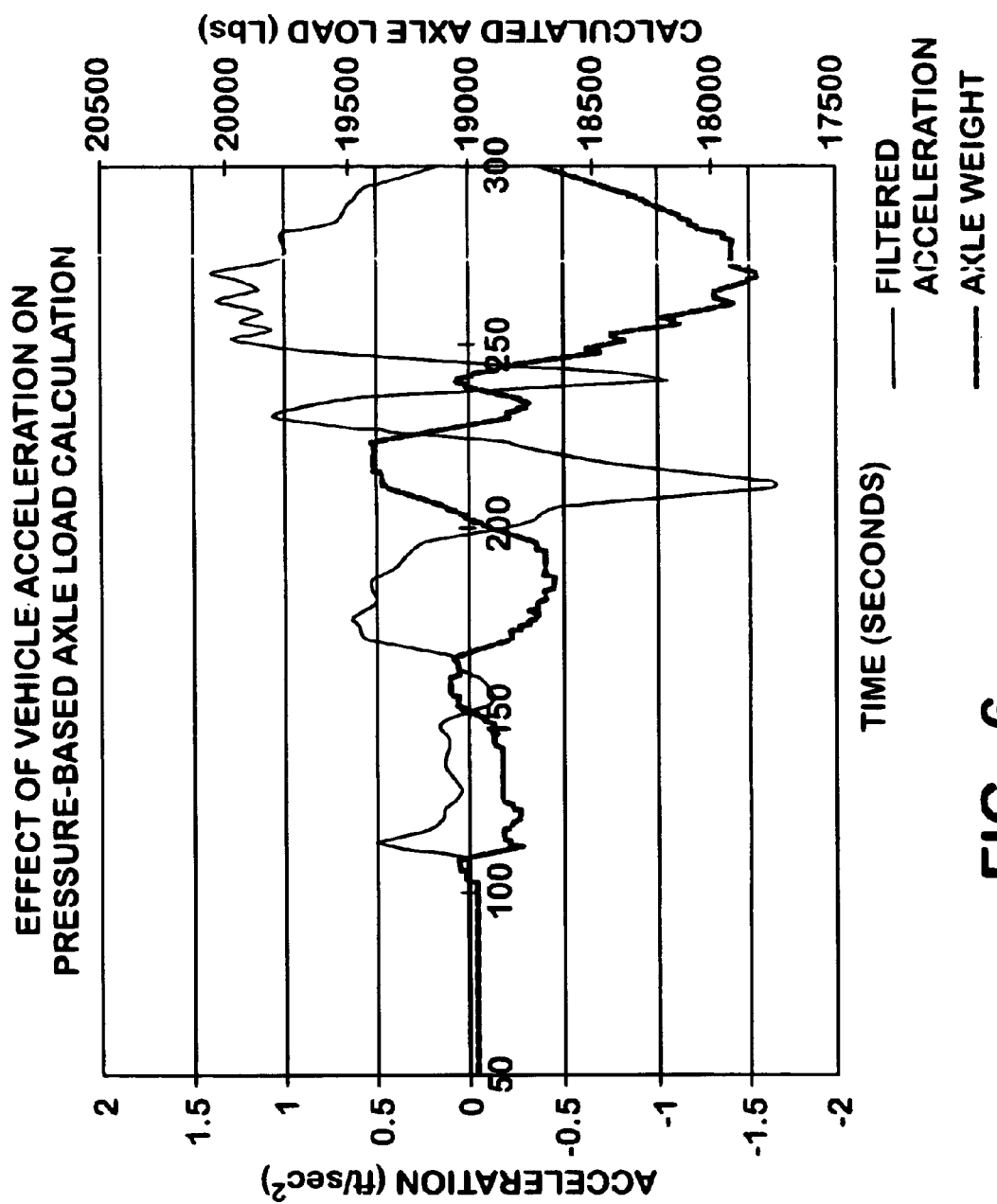
FIG. 6 is a graphical illustration of possible axle load correlated with acceleration against time.

FIG. 6 shows acceleration and axle load as functions of time, illustrating the correlation of measured axle weight to time, shows the effects of acceleration and deceleration on a drive axle, illustrating the transfer of weight off of the axle during periods of positive acceleration and the transfer of weight on to the axle during periods of negative acceleration. Other axles may show an opposite correlation. Where individual sensors are allocated, one to an axle or one per air spring, a simple pressure transducer will accurately reflect the transfer of load on to or off of an axle. If such readings are directly applied to on board instrumentation, the readout can appear unstable to the driver/operator. The algorithm utilized by the present invention applies a heavy filter (lightly weighting the current sample) when vehicle speed is changing and a light filter (heavily weighting the current sample) when vehicle speed is constant. This stabilizes the readout during vehicle operation but allows quick update of readings during vehicle loading and unloading.

Figure 7:
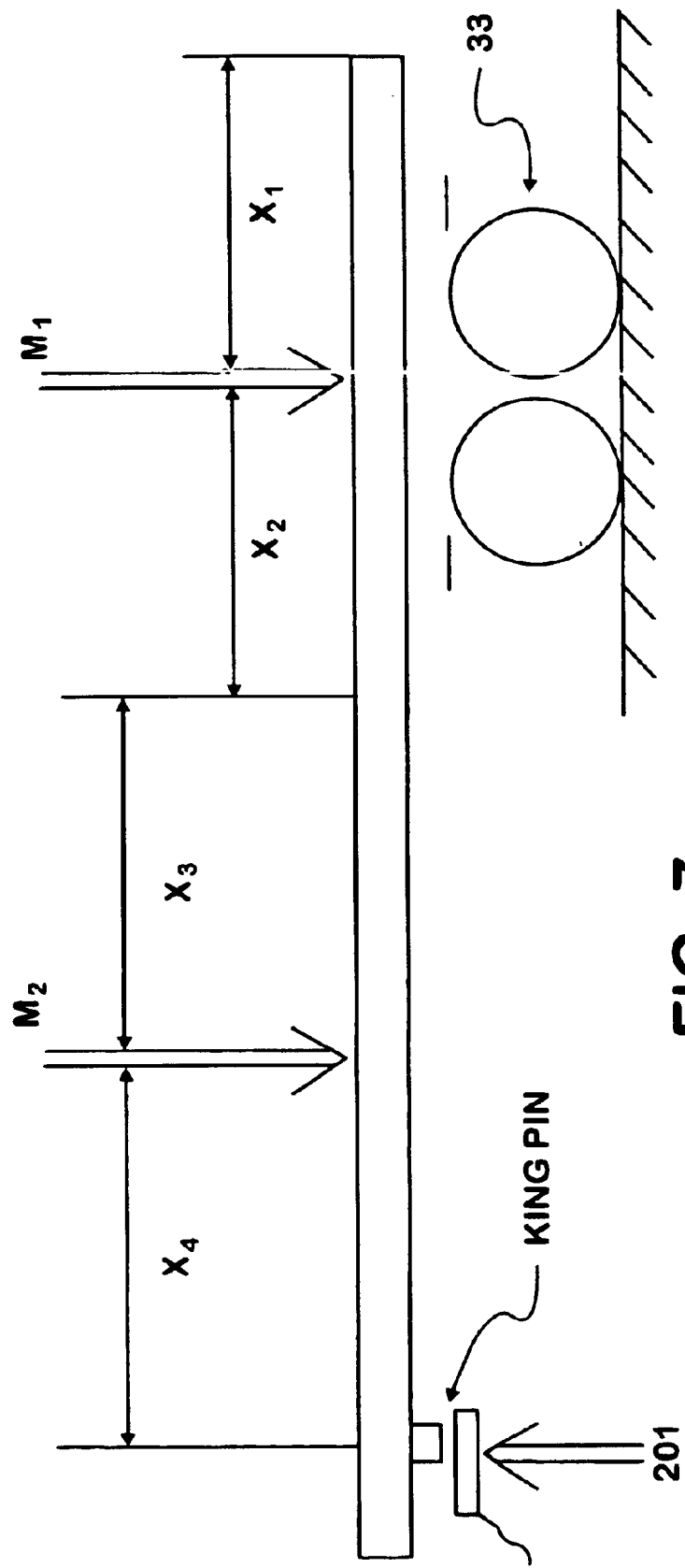
FIG. 7 is a schematic illustration of attachment of a trailer to be weighed.

Estimation of gross combination vehicle weight (GCVW) is usually obtained by adding the axle loads. However, where a trailer 28 does not have an array of load pressure sensors 22, an estimation routine is programmed with certain assumptions about the load. By way of example, it may be assumed that tractor 26 weight is a known quantity, and the weight distribution between the forward vehicle support section 31 and the drive support section 32 are also known. The weight and distribution information can be programmed into the ESC 30 at the assembly plant, by the dealer or by the operator. When a trailer 28 and a tractor 26 are attached, the weight of the load in the trailer may, for example, be assumed to be evenly divided between the trailer's axles (vehicle support structure) 33 and the tractor's 26 drive axles (vehicle support structure) 32. Referring to FIG. 7, GCVW is then simply twice the measured weight on the drive axles, plus the empty weight on the steer axle, with half the trailer load (M1) being carried by the aft vehicle support structure 33 and the other half (M2) by the fifth wheel 201. The accuracy of this estimate can be improved by taking into account fifth wheel 201 position and allowing for different weight distributions between the vehicle support structures. This form of estimation does not work for double or triple trailer combinations.

The algorithm of the present invention is implemented on ESC 30 on data received from the auxiliary gauge controller 20 relating to air spring pressure levels and vehicle speed information which is provided by the transmission (or power train) controller 130. The algorithm generates GCVW and axle load data which are returned to the auxiliary gauge controller 20 for display on an axle load display 121. Consistent with the SAE J1939 protocol, the data, once placed on the J1939 bus 16, are available to any other controller programmed to recognize and use them.

In implementing the algorithm, air pressure in the air springs 44 is periodically sampled, and a transfer function is used to convert the pressure measurement to a load figure on an axle. Typically the transfer function is substantially linear, with a slope and an offset. Other functions are however possible. Accuracy of the calculation is improved by taking into account the prevailing direction of suspension travel. If air suspension pressure last increased, a slope and offset are used reflecting a transfer function similar to the function 400 in FIG. 5 is used. If the pressure last decreased, a slope and offset are used which is similar to function 402. The difference between the curves equated to axle load can be as large as 3000 lbs. Once a new axle load calculation is made, it does not immediately replace the prior value. Instead, a filtered valve is used as the estimate. The filter constant applied to the newest measurement varies depending on whether the vehicle is at a steady state speed or changing speed. If vehicle speed is changing, a heavy filter is used to diminish the effect of the update, i.e. the new measurement is lightly weighted. If vehicle speed is constant a light filter increases the weight given of the new measurement, i.e. the new measurement is heavily weighted. This algorithm allows the displayed load to be updated rapidly if the vehicle is stationary and being loaded, but steadies the display during periods of vehicle operation.

For the algorithm, GCVW is determined for a vehicle comprising trailers lacking air pressure sensors. GCVW is determined by incorporating the measured weight on the drive axle and adding to that the empty weight of the tractor on the steering axle. For vehicles with a tandem drive axle the input weight is the combined weight on the two axles. The portion of the weight to include may be varied depending upon distribution of the load in the trailer and portions of the tractor's fifth wheel relative to the drive axles. GCVW estimate is prone to various sources of error, fifth wheel position, trailer axle position, unevenly distributed loads, and the presence of double and triple trailers.

Figure 8A:
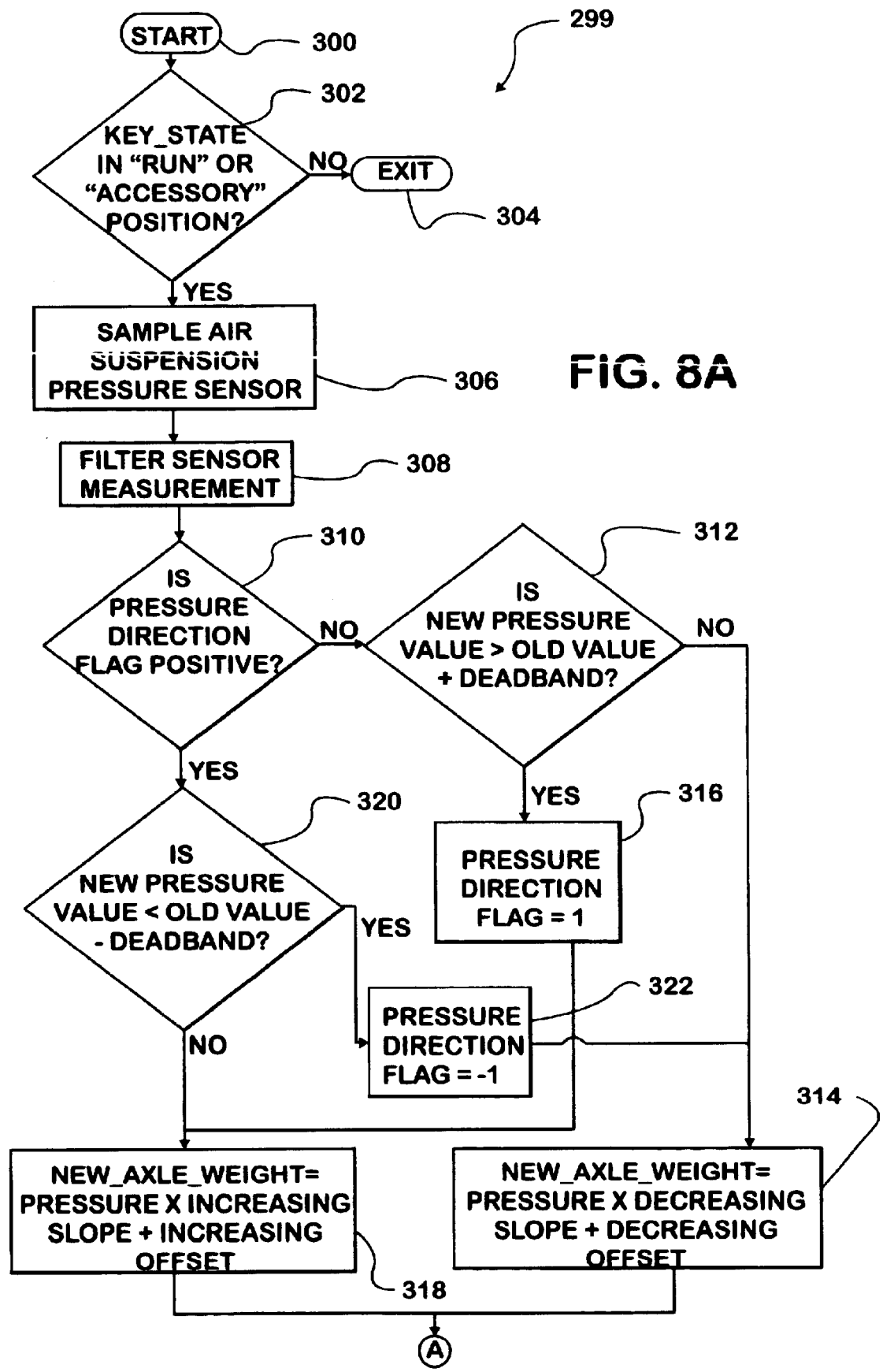
FIG. 8 is a flow chart of a load determination program executed by an electrical system controller.
Figure 8B:
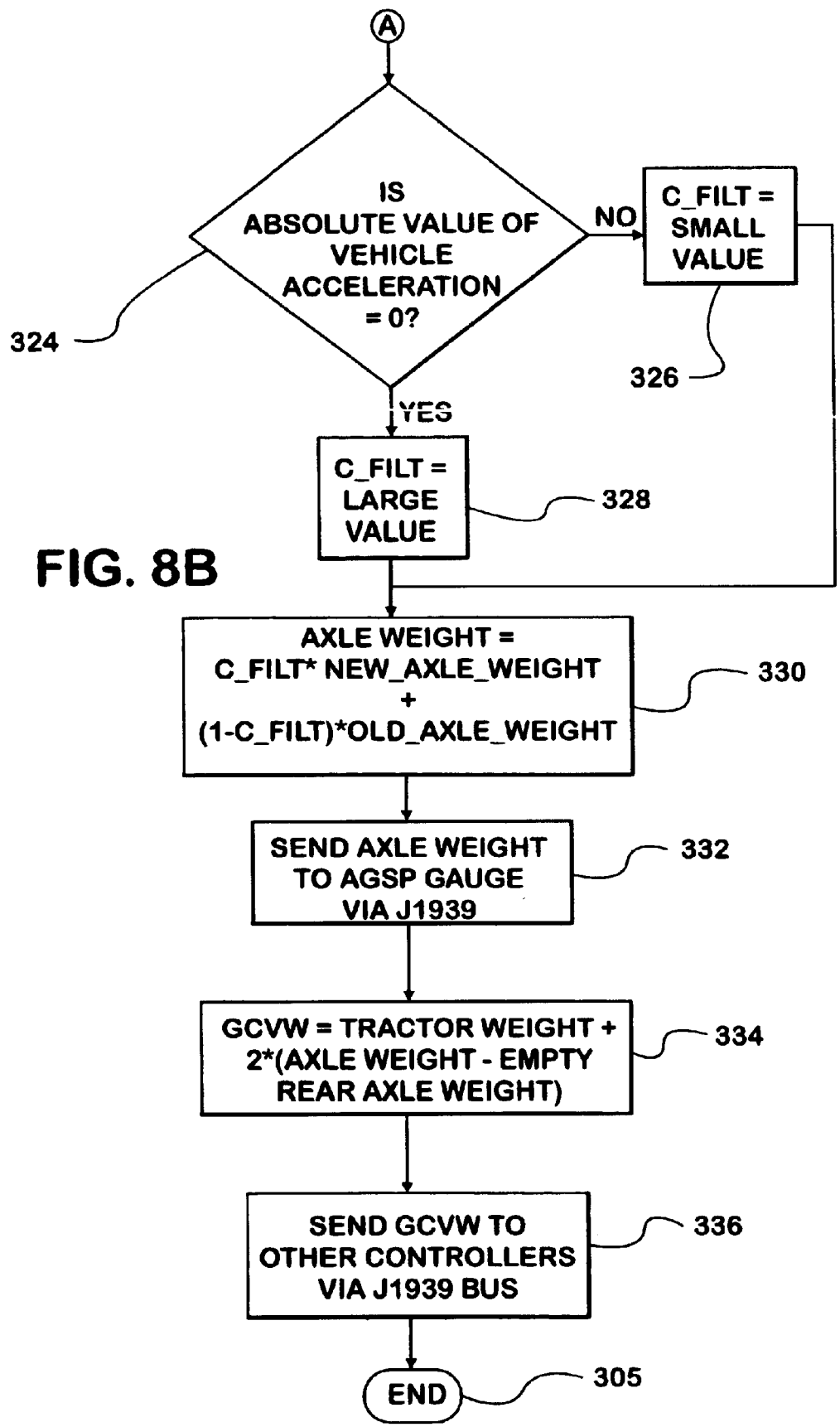

Referring to FIG. 8, an algorithm 299 begins at step 300 moving first to a determination of whether the ignition key position is in the run or accessory positions (step 302). The algorithm executes only upon a YES determination, and consequently the NO branch decision step 302 exits the program (step 304). The measurement of the axle weight for only one axle is described although the process is repeated for other axles, with appropriate substitution of the transfer functions.

Algorithm 299 operates on air pressure measurements, the sampling of which is indicated at step 306. These measurements are subject to filtering (step 308) described in the following steps. With each new measurement the status of a pressure direction flag (step 310) is determined. If the direction flag is not positive (the NO branch) the new measurement is compared to the prior period value plus a deadband offset. If the new value does not exceed the old value plus the offset the NO branch is taken from step 312 to step 314 where the value New_Axle_Weight is determined by multiplying the pressure reading by a value from a decreasing slope look up table. This valve reflects a multiplication of the reading by a conversion factor and adding a decreasing load offset. If the new pressure value is greater than the old value, plus the deadband, the flag direction flag is reset to indicate the positive change (step 316) and New_Axle_Weight is determined at step 318 using the values from a look up table for the increasing load situation.

Where the pressure change direction flag is negative, a different route through the algorithm is taken following step 310. The YES branch from step 310 leads to a comparison step 320 which evaluates the newly measured value against the old value less the deadband. So long as the new pressure reading does not fall below this barrier processing will continue along the NO branch to step 318 for determination of a value of New_Axle_Weight. When the new pressure reading falls below the old value less the deadband value, processing follows the YES branch from step 320 to step 322 which provides for reset of the pressure direction flags to negative and then calculation of the value for New_Axle_Weight using the look up table 314 realization of the transfer function for increasing pressure situations.

Once New_Axle_Weight has been determined, the weight the sample is to be given in calculating axle weight is determined based on vehicle acceleration. At step 324 it is determined if the vehicle acceleration is equal to zero. If acceleration is zero New_Axle_Weight is given a large weight C_filt (i.e. a value close to but less than one) at step 328. If acceleration is not zero, C_filt is set to a small value (i.e., a positive value much nearer to zero than to one) at step 326. After either step 326 or 328 Axle_Weight may be determined at step 330. There Axle-Weight equals C_filt times New_Axle_Weight added to 1-C_filt times the prior value for Axle-Weight. C_filt may, in a more sophisticated implementation of the invention be itself an increasing function in vehicle acceleration. Once Axle-Weight is determined the value is placed on the primary J1939 bus 16 for the use of the several controllers at step 332. Then gross combined vehicle weight is determined from the axle weight calculation at step 334 by combining the several Axle_Weight measurements. Step 334 reflects implementation for a tractor and trailer where the trailer has no air pressure sensors. Finally, at step 336, GCVW is placed on the J1939 bus for the use of other controllers. Processing then concludes at step 305.

The present invention may be implemented in one of several embodiments. It may be implemented on a tractor 26 only. In its simplest form one pressure sensor would be used for the drive axle. Trailers with air suspension allow the use of sensors with the trailer. If a trailer does not have sensors, weight for single trailer may be estimated by changes in load on the tractors drive axles.

Figure 9:
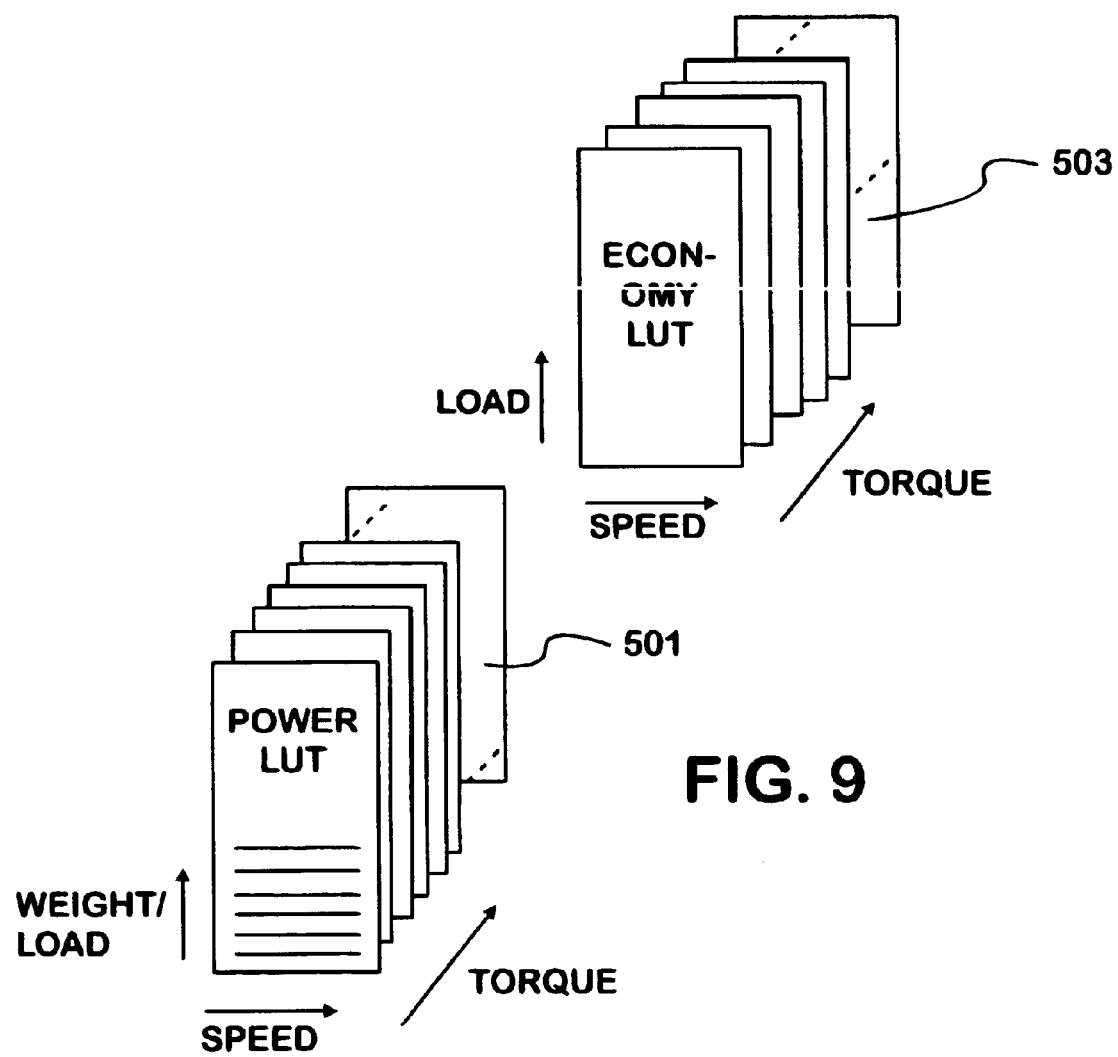
FIG. 9 is a graphical representation of look up tables utilized by a transmission controller.

Referring to FIG. 9, a transmission controller 130 selects a gear for automatic transmission 72 based upon vehicle load, vehicle speed and engine torque, all of which information is provided to controller 130 over bus 16. Transmission 72 operation may be optimized for power using a power look up table 501 or economy using economy look up table 503. Torque output may be limited by engine controller 140 as a function of weight. Particularly, torque may be limited for a heavily loaded vehicle. Accordingly some portions of tables 501 and 503 may not include entries for all combinations of torque, speed and vehicle weight.

The measurement of vehicle weight allows improvement in vehicle performance. If vehicle weight is known, better control of a semi-automatic transmission becomes possible. Unnecessary gear shifts under light loads may be avoided while effective torque limiting may be implemented under heavy loads to avoid drive line component damage or the need to derate engines. Effective drive line control with torque limiting algorithms affords effective drive line component protection through transitory derating of an engine. When axle load at each wheel is determined, basic dynamic control of the suspension becomes possible. Vehicle usage based service intervals may be more fully optimized in view of the knowledge about operating conditions by the invention.

While the invention is taught with application to a trailer loaded evenly, allowance may be made for an uneven load and variation of the proportion of the weight falling on the tractor drive axles based on where in the trailer the load is placed. A non-centered fifth wheel may be accounted for similarly.

While the invention is shown in only one of its forms, it is not thus limited but is susceptible to various changes and modifications without departing from the spirit and scope of the invention.

What is claimed is:

1. An axle load sensing system for a vehicle having an air bladder support system mounted between the frame of the vehicle and an axle, the axle load sensing system comprising:
    at least a first pressure sensor providing air pressure readings for at least one air bladder of the air bladder support system;
    first and second transfer functions relating air pressure in the air bladder to weight carried by the air bladder support system;
    a transfer function indication responsive to a direction of change in air pressure in the air bladder for indicating which of the first and second transfer functions to interrogate to determine axle load; and
    a processor connected to receive the air pressure readings and responsive to the transfer function indication for interrogation of one of the first and second transfer functions using the air pressure readings as an input to return an estimate of load carried by the air bladder support system.

2. An axle load sensing system as claimed in claim 1, wherein the transfer function indication is responsive to prior increases in air bladder pressure for indicating interrogation of the first transfer function and to prior decreases in air bladder pressure for indicating interrogation of the second transfer function.

3. An axle load sensing system as claimed in claim 2, further comprising:
    means for accumulating returned estimates to provide a running indication of the load on the air bladder support system.

4. An axle load sensing system as claimed in claim 3, the means for accumulating further comprising:
    means responsive to vehicle acceleration for differentially weighting the returned estimate and the prior accumulated returned estimates before combination.

5. An axle load sensing system as claimed in claim 4, further comprising:
    a gauge controller connected to receive the running indication of the load and generating a stepper motor positioning signal in response thereto;
    a stepper motor connected to the gauge controller to receive the stepper motor positioning signal; and
    a load gauge controlled by the stepper motor.

6. An axle load sensing system as claimed in claim 5, wherein load is determined for each air bladder independently.

7. An axle load sensing system as claimed in claim 5, wherein load is determined axle by axle.

8. An axle load sensing system as claimed in claim 5, wherein load is determined by groups of like situated axles.

9. An axle load sensing system as claimed in claim 5, wherein load is determined independently for the steering axle and for the drive axles of a tractor.

10. An axle load sensing system as claimed in claim 9, installed on a vehicle assembled from a tractor having a set of drive axles and an air bladder suspension system including air bladder pressure sensors for the drive axles and a trailer, the trailer being attached to the tractor by a fifth wheel over the set of drive axles, the axle load sensing system further comprising the processor including programming to determine trailer weight by finding the load on an air bladder suspension system for the set of drive axles.

11. A vehicle comprising:
    a tractor having a steering axle and at least a first drive axle;
    a front suspension supporting the tractor from the steering axle and a rear suspension supporting the tractor from the first drive axle, the front suspension and the rear suspension each including at least one air bladder as a primary load bearing element;
    air pressure sensors coupled to the air bladders for providing pressure readings;
    a controller area network installed on the vehicle including a bus, an auxiliary controller connected to the bus for receiving air pressure sensor readings and an electronic system controller connected to the bus for communication with the auxiliary controller, the electronic system controller having a load determining program taking the air pressure sensor readings as inputs for determining loads on the steering axle and the first drive axle;
    a plurality of transfer functions relating air pressure sensor readings to loads on each air bladder, including a first transfer function operative if load last increased and a second transfer function operative if load last decreased; and
    the transfer functions returning load estimates upon interrogation by the electronic system controller executing the load determining program using pressure readings as inputs.

12. A vehicle as claimed in claim 11, the load determining program further comprising:
    means for accumulating the load estimates as returned for a running load determination and placing the running load determination on the bus.

13. A vehicle as claimed in claim 12, wherein the means for accumulating is responsive to vehicle acceleration occurring concurrently with an air pressure measurement reading for reducing the relative weight given the load associated with that air pressure measurement reading and increasing the relative weight of the current running load determination.

14. A vehicle as claimed in claim 13, further comprising:
    an engine controller for generating an engine torque estimate and transmitting the engine torque estimate on the bus;
    means for generating an instantaneous estimate of vehicle speed and transmitting the vehicle speed estimate on the bus;
    a transmission; and
    a transmission controller for selecting a gear in the transmission in response to the vehicle speed estimate, the running load determination and the engine torque estimate from look up tables, the look up tables comprising gear selections keyed to the combinations of inputs.

15. A vehicle as claimed in claim 13, further comprising:

a fifth wheel positioned over the at least first drive axle;

a trailer attached to the tractor on the fifth wheel;

a programmed relationship of air pressure sensor readings for the air bladder for the first drive axle to a load in the trailer.

16. A vehicle as claimed in claim 13, further comprising:

a trailer attached to the tractor, the trailer including at least a first axle and an air bladder suspension supporting the trailer from the axle;

the tractor having a fifth wheel over the drive axle by which the trailer is attached to the tractor; and the program relating load on the drive axle to trailer load.

17. A vehicle as claimed in claim 16, further comprising:

the electronic system controller placing the accumulated determinations of axle loads on the controller area network for the use of other controllers.

18. A vehicle as claimed in claim 17, further comprising:

a stability controller responsive to the accumulated determinations of axle loads for changing air bladder pressure for stabilizing the vehicle.

19. A vehicle as claimed in claim 17, further comprising:

means for determining gross combined vehicle weight from the axle load determinations.

20. A vehicle as claimed in claim 19, further comprising:

a transmission; and a transmission controller connected to the controller area network and responsive to the determination of gross combined vehicle weight for adjusting standing start start up gear, and shift points for the transmission.

21. A vehicle as claimed in claim 14, further comprising different sets of look up tables, a first optimized for power and a second optimized for economy of vehicle operation.

22. A vehicle as claimed in claim 19, further comprising:

means for derating the engine in response to the determination of gross combined vehicle weight.

23. A vehicle as claimed in claim 20, further comprising:

means for derating the engine in response to the determination of gross combined vehicle weight.

* * * * *